US012678824B2

(12) United States Patent
Wang et al.

(10) Patent No.: US 12,678,824 B2
(45) Date of Patent: *Jul. 14, 2026

(54) MULTI-LAYER COATINGS AND METHODS OF PREPARING THE SAME

(71) Applicant: PPG Industries Ohio, Inc., Cleveland, OH (US)

(72) Inventors: Wei Wang, Allison Park, PA (US); David Robert Fenn, Allison Park, PA (US); Leigh Ann Humbert, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 355 days.

This patent is subject to a terminal disclaimer.

(21) Appl. No.: 17/757,082

(22) PCT Filed: Dec. 10, 2020

(86) PCT No.: PCT/US2020/064165
§ 371 (c)(1),
(2) Date: Jun. 9, 2022

(87) PCT Pub. No.: WO2021/119227
PCT Pub. Date: Jun. 17, 2021

(65) Prior Publication Data
US 2023/0001450 A1 Jan. 5, 2023

Related U.S. Application Data

(60) Provisional application No. 62/946,171, filed on Dec. 10, 2019.

(51) Int. Cl.
B05D 7/00 (2006.01)
C09D 151/08 (2006.01)
C09D 175/00 (2006.01)

(52) U.S. Cl.
CPC ............. *B05D 7/572* (2013.01); *B05D 7/574* (2013.01); *B05D 7/578* (2013.01); *C09D 151/08* (2013.01); *C09D 175/00* (2013.01)

(58) Field of Classification Search
None
See application file for complete search history.

(56) References Cited

U.S. PATENT DOCUMENTS

| | | | | |
|---|---|---|---|---|
| 4,711,918 A | * | 12/1987 | Kubitza | ............... C09D 157/00 524/196 |
| 4,933,056 A | | 6/1990 | Corrigan et al. | |
| 5,530,043 A | | 6/1996 | Zawacky et al. | |
| 5,760,107 A | | 6/1998 | Valko et al. | |
| 5,820,987 A | | 10/1998 | Kaufman et al. | |
| 7,288,595 B2 | | 10/2007 | Swarup et al. | |
| 7,910,211 B2 | | 3/2011 | Avgenaki et al. | |
| 8,147,919 B2 | | 4/2012 | Chilla et al. | |
| 8,313,835 B2 | | 11/2012 | Avgenaki et al. | |
| 8,846,156 B2 | | 9/2014 | Swarup et al. | |
| 9,636,703 B2 | | 5/2017 | Iwata et al. | |
| 11,980,912 B2 | * | 5/2024 | Wang | ............... C08F 220/1804 |
| 2001/0023273 A1 | * | 9/2001 | Moos | ................... C09D 175/02 524/507 |
| 2002/0123562 A1 | * | 9/2002 | Stender | ................... B05D 7/52 524/589 |
| 2006/0189750 A1 | * | 8/2006 | Maier | ................... C09D 175/04 524/589 |
| 2006/0223953 A1 | | 10/2006 | Drescher et al. | |
| 2008/0119612 A1 | * | 5/2008 | Scherer | ............... C08G 18/089 525/123 |
| 2009/0131603 A1 | * | 5/2009 | Asahina | ............. C08G 18/7837 525/453 |
| 2009/0169763 A1 | | 7/2009 | Tiegs et al. | |
| 2012/0034468 A1 | | 2/2012 | Low et al. | |
| 2014/0242281 A1 | | 8/2014 | Swarup et al. | |
| 2014/0295091 A1 | | 10/2014 | Stoffel et al. | |
| 2015/0093512 A1 | | 4/2015 | Brunner et al. | |
| 2015/0210883 A1 | | 7/2015 | Swarup et al. | |
| 2015/0267077 A1 | | 9/2015 | Janoski, Sr. et al. | |
| 2017/0136493 A1 | | 5/2017 | Lamers et al. | |
| 2019/0023938 A1 | | 1/2019 | Kurashina et al. | |

(Continued)

FOREIGN PATENT DOCUMENTS

| | | | |
|---|---|---|---|
| CN | 102405111 A | 4/2012 | |
| CN | 107434842 A | * 12/2017 | ............... C09D 5/08 |

(Continued)

OTHER PUBLICATIONS

Bayer MaterialScience, Bayhydur (RTM) 3100, Product Datasheet, 2011. (Year: 2011).*
Covestro, Desmodur (RTM) N3400, Product Datasheet, 2018. (Year: 2018).*
Bayer MaterialScience, "The Chemistry of Polyurethane Coatings", Aug. 2005, retrieved from U.S. Pat. No. 10,195,487. (Year: 2005).*
Covestro, Polyisocyanates and Prepolymers, 2017, retrieved from U.S. Pat. No. 10,059,794. (Year: 2017).*
Machine translation of CN107434842A, published Dec. 2017, Powered by EPO and Google. (Year: 2017).*
International Search Report and Written Opinion received for PCT Application Serial No. PCT/US2020/064165 dated Mar. 22, 2021, 9 pages.

*Primary Examiner* — Monique R Jackson

(57) ABSTRACT

A multi-layer coating system includes: a first basecoat layer formed from a first coating composition including a free polyisocyanate having a weight average molecular weight of less than 600 g/mol and hydroxyl functional polymeric core-shell particles, where an amount of free polyisocyanate having a weight average molecular weight of less than 600 g/mol is 3.5 weight % or greater; a second basecoat layer formed from a second coating composition including carboxylic acid functional polymeric core-shell particles; and a topcoat layer formed from a coating composition including a free polyisocyanate and a film-forming resin reactive with the free polyisocyanate.

20 Claims, No Drawings

(56)          References Cited

U.S. PATENT DOCUMENTS

2022/0064479 A1      3/2022  Gan et al.
2022/0134380 A1*    5/2022  Ohnuki ................ C08F 220/56
                                                    427/407.1

FOREIGN PATENT DOCUMENTS

| | | | |
|---|---|---|---|
| CN | 108778529 | A | 11/2018 |
| CN | 108883434 | A | 11/2018 |
| JP | 2017-170305 | A | 9/2017 |
| MX | 2020013506 | A | 2/2021 |
| RU | 2254351 | C2 | 6/2005 |
| RU | 2617490 | C2 | 4/2017 |
| WO | 2008051346 | A1 | 5/2008 |
| WO | 2017030545 | A1 | 2/2017 |
| WO | 2017087933 | A1 | 5/2017 |
| WO | 2017160398 | A1 | 9/2017 |
| WO | 2017162475 | A1 | 9/2017 |
| WO | 2019241203 | A1 | 12/2019 |

* cited by examiner

MULTI-LAYER COATINGS AND METHODS OF PREPARING THE SAME

FIELD OF THE INVENTION

The present invention relates to multi-layer coatings that can be applied to substrates such as automotive substrates and methods of preparing and applying such coatings.

BACKGROUND OF THE INVENTION

Coatings are applied to a wide variety of substrates to provide color and other visual effects, corrosion resistance, abrasion resistance, chemical resistance, and the like. In addition, various types of coatings, such as coatings applied to automotive substrates including vehicles and motorcycles, can be formed from compositions that can be baked and formed at low cure temperatures. Because these compositions can be baked at low cure temperatures, they have been found useful in forming multi-layer coatings which often include a topcoat layer applied over the basecoat layer(s). It is accordingly an objective of the present invention to provide multi-layer coatings that can be dehydrated and cured at comparatively low temperatures to form coatings having various properties, thereby reducing costs and increasing efficiency of coating processes such as in the automotive industry, for example.

SUMMARY OF THE INVENTION

The present invention relates to a multi-layer coating system that includes: (a) a first basecoat layer formed from a first coating composition including at least one free polyisocyanate having a weight average molecular weight of less than 600 g/mol and hydroxyl functional polymeric core-shell particles, in which a polymeric core and a polymeric shell of the hydroxyl functional core-shell particles each independently comprise an addition polymer derived from ethylenically unsaturated monomers and an amount of the free polyisocyanate having a weight average molecular weight of less than 600 g/mol is 3.5 weight % or greater, based on the total resin solids of the first coating composition; (b) a second basecoat layer applied over at least a portion of the first basecoat layer, the second basecoat layer formed from a second coating composition comprising carboxylic acid functional polymeric core-shell particles in which a polymeric core of the carboxylic acid functional core-shell particles includes an addition polymer derived from ethylenically unsaturated monomers and a polymeric shell of the carboxylic acid functional core-shell particles includes urethane linkages and carboxylic acid functional groups; and (c) a topcoat layer applied over at least a portion of the second basecoat layer, the topcoat layer formed from a coating composition including a free polyisocyanate and a film-forming resin reactive with the free polyisocyanate.

The present invention also relates to a process of coating a substrate with a multi-layer coating including: (i) depositing a first coating composition onto at least a portion of the substrate, where the first coating composition includes at least one free polyisocyanate having a weight average molecular weight of less than 600 g/mol and hydroxyl functional polymeric core-shell particles, where a polymeric core and a polymeric shell of the hydroxyl functional core-shell particles each independently comprise an addition polymer derived from ethylenically unsaturated monomers and wherein an amount of free polyisocyanate having a weight average molecular weight of less than 600 g/mol is 3.5 weight % or greater, based on the total resin solids of the first coating composition; (ii) depositing a second coating composition directly onto at least a portion of the first coating composition (1) after the first coating composition is dehydrated or (2) before the first coating composition is dehydrated, where the second coating composition includes carboxylic acid functional polymeric core-shell particles in which a polymeric core of the carboxylic acid functional core-shell particles includes an addition polymer derived from ethylenically unsaturated monomers and a polymeric shell of the carboxylic acid functional core-shell particles includes urethane linkages and carboxylic acid functional groups; (iii) dehydrating: (a) the second coating composition after (ii)(1); or (b) simultaneously the first coating composition and the second coating composition after (ii)(2); and (iv) depositing a topcoat coating composition over at least a portion of the dehydrated second basecoat composition, the topcoat coating composition including a free polyisocyanate and at least one film-forming resin reactive with the free polyisocyanate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" core-shell particle, "a" free polyisocyanate, and the like refer to one or more of any of these items.

The present invention is related to a multi-layer coating that comprises at least a first basecoat layer, a second basecoat layer, and a topcoat layer. A "basecoat" refers to a coating that is deposited onto a primer and/or directly onto a substrate, optionally including components (such as pigments) that impact the color and/or provide other visual impact. A "topcoat" refers to an uppermost coating that is deposited over another coating layer such as a basecoat to provide a protective and/or decorative layer.

The first basecoat layer can be formed from a coating composition that comprises a free polyisocyanate and at least one type of polymeric core-shell particles.

As used herein, a "free polyisocyanate" refers to polyisocyanates in which at least some of the isocyanate functional groups (also referred to herein as "NCO groups") are not blocked. Non-limiting examples of free isocyanates include any of the following compounds in which the NCO groups are not blocked: aliphatic polyisocyanates; aromatic polyisocyanates; cycloaliphatic polyisocyanates; heterocyclic polyisocyanates; monomeric polyisocyanates; polymeric polyisocyanates; adducts thereof, such as isocyanurates thereof and/or biurets thereof; a uretdione; and mixtures thereof.

Non-limiting examples of free polyisocyanates include the following compounds in which the NCO groups are not blocked: isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI), p-xylylenediisocyanate, 4-chloro-1,3-phenylene diisocyanate, 1,5-tetrahydro-naphthalene diisocyanate, 4,4'-dibenzyl diisocyanate, 1,2,4-benzene triisocyanate, xylylene diisocyanate (XDI), trimethylene diisocyanate, tetramethylene-1,4-diisocyanate, pentamethylene-1,5-diisocyanate, hexamethylene diisocyanate, 1,2-propylene diisocyanate, 1,2-butylene diisocyanate, 2,3-butylene diisocyanate, 1,3-butylene diisocyanate, 2,2,4-trimethylhexamethylene-1,6-diisocyanate, 2,6-diisocyanatomethylcaproate, lysine ester triisocyanate, lysine methyl ester diisocyanate, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanate-5-isocyanato methyloctane, 1,3-cyclopentane diisocyanate, 1,4-cyclohexane diisocyanate, 1,3-cyclohexane diisocyanate, 3-isocyanatomethyl-3,5,5-trimethylcyclohexyl isocyanate, 4,4'-methylenebis(cyclohexylisocyanate), methyl-2,4-cyclohexane diisocyanate, methyl-2,6-cyclohexane diisocyanate, 1,3-bis(isocyanatomethyl) cyclohexane, 1,4-bis(isocyanatomethyl)cyclohexane, norbornane diisocyanate, 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)bicycle[2.2.1] heptane, 3-(3-isocyanatopropyl)-2,5-di(isocyanatomethyl)-bicyclo[2.2.1]heptane, 5-(2-isocyanatoethyl)-2-isocyantomethyl-3-(3-isocyanatopropyl)-bicyclo[2.2.1] heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)bicyclo[2.2.1]heptane, 6-(2-isocyanatoethyl)-2-isocyanatomethyl-2-(3-isocyanatopropyl)-bicyclo[2.2.1]heptane, 1,3-xylylene diisocyanate, 1,4-xylylene diisocyanate, ω,ω'-diisocyanato-1,4-diethylbenzene, 1,3-bis(1-iso-cyanato-1-methylethyl) benzene, 1,4-bis(1-iso-cyanato-1-methylethyl)benzene, 1,3, 5-triisocyanate methylbenzene, m-phenylene diisocyanate, p-phenylene diisocyanate, 4,4'-diphenyl diisocyanate, 1,5-naphthalene diisocyanate, 2,4'-diphenylmethane diisocyanate, 4,4'-diphenylmethane diisocyanate, 2,4-tolylene diisocyanate, 2,6-tolylene diisocyanate, 4,4'-toluidine diisocyanate, 4,4'-diphenylether diisocyanate, triphenylmethane-4,4', 4"-triisocyanate, 1,3,5-triisocyanato benzene, 2,4,6-triisocyanato toluene, 4,4'-diphenylmethane-2,2',5,5'-tetraisocyanate, diphenyl methane-2,4'-diisocyanate, 3,3'-dimethyl-4,4'-diphenylene diisocyanate, dodecane-1,12-diisocyanate, cyclobutane-1,3-diisocyanate, biphenyl diisocyanate, bis(isocyanato ethyl)fumarate, toluene-2,4-diisocyanate, hexahydrotoluene-2,4-diisocyanate, toluene-2, 6-diisocyanate, hexahydrotoluene-2,6-diisocyanate; hexahydrophenylene-1,3-diisocyanate, hexahydrophenylene-1, 4-diisocyanate, perhydrodiphenylmethane-2,4'-diisocyanate, perhydrodiphenylmethane-4,4'-diisocyanate, isocyanurates thereof (such as isocyanurate trimers), adducts thereof, biurets thereof, mixtures thereof, and combinations thereof.

Further non-limiting examples free polyisocyanates are free polymeric polyisocyanates which includes the following compounds in which at least some of the isocyanate functional groups are not blocked: polymeric HDI, polymeric MDI, polymeric isophorone diisocyanate, and the like. The free polymeric polyisocyanate may have a weight average molecular weight of less than 600 g/mol.

It is appreciated that one or more, such as at least two different or at least three different, free polyisocyanates can be used in the coating composition that forms the first basecoat layer. In accordance with the present invention, at least one of the free polyisocyanates that forms the coating composition of the first basecoat layer has a weight average molecular weight of less than 600 g/mol. An amount of free polyisocyanate having a weight average molecular weight of less than 600 g/mol in the coating composition that forms the first basecoat layer is 3.5 weight % or greater, or 3.6 weight % or greater, or 4 weight % or greater, or 4.5 weight % or greater, or 5 weight % or greater, based on the total resin solids of the coating composition that forms the first basecoat layer. The free polyisocyanate having a weight average molecular weight of less than 600 g/mol can also comprise less than 20 weight %, or 15 weight % or less, or 10 weight % or less, or 8 weight % or less, based on the total resin solids of the coating composition that forms the first basecoat layer. The free polyisocyanate having a weight average molecular weight of less than 600 g/mol can comprise an amount ranging from, for example, 3.5 weight % or greater to less 20 weight %, or 3.5 weight % or greater to 10 weight % or less, or 3.5 weight % or greater to 8 weight % or less, based on the total resin solids of the coating composition that forms the first basecoat layer.

The weight average molecular weight is determined by gel permeation chromatography relative to linear polystyrene standards of 800 to 900,000 Da using a Waters 2695 separation module with a Waters 2414 differential refractometer (RI detector), manufactured by the Waters Corporation (Milford, MA). Tetrahydrofuran (THF) is used as the eluent at a flow rate of 1 ml min-1, and two PLGEL MIXED-C (300×7.5 mm) columns, manufactured by Agilent Technologies (Santa Clara, CA), are used for separation at 25° C.

The free polyisocyanate(s) used in the composition that forms the first basecoat layer can also comprise greater than 9.5 weight %, or greater than 12 weight %, of a uretdione dimer, based on the total resin solids weight of all the free polyisocyanate in the coating composition that forms the first basecoat layer. The free polyisocyanate(s) used in the composition that forms the first basecoat layer can also comprise up to 50 weight %, or up to 45 weight %, or up to 40 weight %, of an uretdione dimer, based on the total resin solids weight of all the free polyisocyanate in the coating composition that forms the first basecoat layer. The free polyisocyanate(s) used in the composition that forms the first basecoat layer can also comprise an amount ranging from greater than 9.5 weight % to 50 weight %, or from greater 9.5 weight % to 40 weight %, or from greater 9.5 weight % to 30 weight %, or from 12 weight % to 30 weight %, of a uretdione dimer, based on the total resin solids weight of all the free polyisocyanate in the coating composition that forms the first basecoat layer. The uretdione dimer may have a weight average molecular weight of less than 600 g/mol.

The amount of uretdione dimer may be determined using gel permeation chromatography, with the specified polystyrene standard and apparatus described above, when the uretdione dimer is the only low molecular weight (400-700 g/mol) free isocyanate in the composition, as would be understood by one having ordinary skill in the art. The amount of uretdione dimer may be determined by NMR spectroscopy when the uretdione dimer is not the only low molecular weight free isocyanate in the composition, as would be understood by one having ordinary skill in the art.

It was found that the previously described amounts of free polyisocyanates having a weight average molecular weight of less than 600 g/mol and the amounts of uretdione dimer based polyisocyanate used to form the first basecoat layer can provide improved properties to the first basecoat layer and multi-layer coating described in further detail herein. For example, the first basecoat layer comprising the previously described polyisocyanates was found to provide improved humidity resistance and durability to the final multi-layer coating.

As indicated, the coating composition that forms the first basecoat layer also comprises at least one type, or at least two different types, of polymeric core-shell particles. As used herein, a core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). The core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a ZETASIZER 3000HS, manufactured by Malvern Instruments (Worcestershire, United Kingdom), following the instructions in the ZETASIZER 3000HS manual.

As indicated, the core-shell particles comprise a polymeric core as well as a polymeric shell. A "polymeric core" means that the core of the core-shell particle comprises one or more polymers and a "polymeric shell" means that the shell of the core-shell particle comprises one or more polymers. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

A non-limiting example of a core-shell particle that can be used with the first coating composition includes hydroxyl functional polymeric core-shell particles in which a polymeric core and a polymeric shell of the hydroxyl functional core-shell particles each independently comprise an addition polymer derived from ethylenically unsaturated monomers. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth) acrylate" refers to both the methacrylate and the acrylate.

Specific non-limiting examples of ethylenically unsaturated monomers that can be used to form the hydroxyl functional core-shell particles include, but are not limited to, alkyl esters of (meth)acrylic acid, hydroxyalkyl esters of (meth)acrylic acid, acid group containing ethylenically unsaturated monomers, vinyl aromatic monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, and combinations thereof. The alkyl group of the alkyl esters of (meth)acryl acid may be optionally substituted by functional groups other than hydroxyl groups, for example as in acetoacetoxyethyl (meth)acrylate or, acetoacetoxypropyl (meth)acrylate. In addition, the monomer composition may include monomers having at least two ethylenically unsaturated groups. Examples include vinyl (meth)acrylate, di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth) acrylic acid include hydroxymethyl (meth)acrylate, hydroxyethyl (meth)acrylate, hydroxypropyl (meth)acrylate, hydroxybutyl (meth)acrylate, and combinations thereof.

Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butyl styrene, vinyl naphthalene, vinyl toluene, divinyl aromatic monomers, such as divinyl benzene, and combinations thereof.

The polymeric core and polymeric shell of the core-shell particles are also prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. As used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in an aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups including the hydroxyl groups and optionally carboxylic acid functional groups or salts thereof. Carboxylic acid functional groups can be at least partially neutralized (i.e., at least 30% of the total neutralization equivalent) by a base, such as a volatile amine, to form a salt group. Neutralization of the acid-functional polymer may be theoretically determined based on the equivalence of the amine (or other base) divided by the equivalence of the acid (of the acid-functional polymer). A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines may evaporate during the formation of the coating to expose the carboxylic acid functional groups and allow the carboxylic acid functional groups to undergo further reactions. Other non-limiting examples of water-dispersible groups include polyoxyalkylene groups such as by using polyethylene/propylene glycol ether materials, for example.

It is appreciated that the hydroxyl functional core-shell particles are obtained from at least hydroxyl functional ethylenically unsaturated monomers and ethylenically unsaturated monomers that are free of water-dispersible groups. Further, the polymeric shell of the hydroxyl functional core-shell particles comprises the hydroxyl functional groups while the polymeric core can be free of hydroxyl functional groups or has a low amount of hydroxyl functional groups as compared to the amount of hydroxyl functional groups on the shell.

Further, the polymeric shell of the hydroxyl functional polymeric core-shell particles of the first coating composition can be obtained from components that comprise greater than 10 weight % of a hydroxyl functional ethylenically unsaturated monomer, or greater than 25 weight % of a hydroxyl functional ethylenically unsaturated monomer, or greater than 35 weight % of a hydroxyl functional ethylenically unsaturated monomer, based on the total weight of the components that form the polymeric shell. The polymeric shell of the hydroxyl functional polymeric core-shell particles of the first coating composition can be obtained from components that comprise up to 45 weight % of a hydroxyl functional ethylenically unsaturated monomer, or up to 40 weight % of a hydroxyl functional ethylenically unsaturated monomer, based on the total weight of the components that form the polymeric shell. The polymeric shell of the hydroxyl functional polymeric core-shell particles of the first coating composition can be obtained from components that comprise an amount ranging from 20 weight % to 40 weight % of a hydroxyl functional ethylenically unsaturated monomer, based on the total weight of the components that form the polymeric shell.

The hydroxyl functional ethylenically unsaturated monomer used to form the hydroxyl functional polymeric core-shell particles of the first coating composition can also be used to form a separate homopolymer in order to evaluate the Van Krevelen solubility parameter of polymers formed with the monomer. For instance, the homopolymer formed from the hydroxyl functional ethylenically unsaturated monomer used to form the hydroxyl functional polymeric core-shell particles, such as to form the polymeric shell, of the first coating composition can have a Van Krevelen solubility parameter at 298K of greater than 25.0 MPa$^{0.5}$, or a solubility parameter at 298K of greater than 26.0 MPa$^{0.5}$. The Van Krevelen solubility parameter for a homopolymer is calculated using Synthia implemented in Material Studio 5.0, commercially available from Accelrys, Inc. (San Diego, CA).

The polymeric shell of the hydroxyl functional polymeric core-shell particles of the first coating composition can comprise at least 5 weight %, at least 10 weight %, or at least 15 weight % of each core-shell particle, based on the total solids weight of the core-shell particle. The polymeric shell of the hydroxyl functional polymeric core-shell particles of the first coating composition can comprise up to 30 weight %, up to 25 weight %, or up to 20 weight % of each core-shell particle, based on the total solids weight of the core-shell particle. The polymeric shell of the hydroxyl functional polymeric core-shell particles of the first coating composition can further comprise an amount ranging from 5 weight % to 30 weight %, or from 10 weight % to 20 weight %, of each core-shell particle, based on the total solids weight of the core-shell particle.

One or more, including all for example, of the hydroxyl functional polymeric core-shell particles of the first coating composition can comprise a weight ratio of the core to the shell of from 95:5 to 70:30, or from 90:10 to 75:25, or from 90:10 to 80:20, or from 85:15 to 80:20.

The hydroxyl functional core-shell particles can also comprise additional functional groups. Non-limiting examples of additional functional groups that can be formed on the polymeric shell and/or polymeric core include amine groups, epoxide groups, carboxylic acid groups, thiol groups, carbamate groups, amide groups, urea groups, isocyanate groups (including blocked isocyanate groups), aldo groups (aldehyde groups), keto groups (ketone groups), ethylenically unsaturated groups, and combinations thereof. For instance, the polymeric shell can also comprise carboxylic acid functional groups in addition to the hydroxyl functional groups. It is appreciated that the polymeric shell, polymeric core, or both can be free of (i.e., does not contain) any of the previously described functional groups, such as being free of aldo groups and keto groups.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the ethylenically unsaturated groups of the monomers and/or prepolymers that are used to form the polymeric shell and polymeric core can be reacted with each other to form a chemical bond. As used herein, a "prepolymer" refers to a polymer precursor capable of further reactions or polymerization by one or more reactive groups to form a higher molecular mass or cross-linked state.

The hydroxyl functional polymeric core-shell particles of the first coating composition can comprise at least 20 weight %, at least 25 weight %, or at least 30 weight %, based on the total resin solids weight of the coating composition that forms the first basecoat layer. The hydroxyl functional polymeric core-shell particles of the first coating composition can also comprise up to 60 weight %, up to 50 weight %, or up to 40 weight %, based on the total resin solids weight of the coating composition that forms the first basecoat layer. The hydroxyl functional polymeric core-shell particles of the first coating composition can further comprise an amount ranging from 20 weight % to 60 weight %, or from 25 weight % to 50 weight %, or from 25 weight % to 40 weight %, or from 30 weight % to 40 weight %, based on the total resin solids weight of the coating composition that forms the first basecoat layer.

The core-shell particles of the first coating composition that forms the first basecoat layer can also be chosen from carboxylic acid functional polymeric core-shell particles (different from the above-described hydroxyl functional polymeric core-shell particles) that comprise a polymeric core comprising an addition polymer derived from ethylenically unsaturated monomers and a polymeric shell comprising urethane linkages and carboxylic acid functional groups. The polymeric shell can also comprise additional linkages including, but not limited to, ester linkages, ether linkages, urea linkages, and combinations thereof.

As indicated, the polymeric shell comprises carboxylic acid functional groups. The polymeric shell and/or core can also comprise additional functional groups. Other non-limiting examples of functional groups that can be formed on the polymeric shell and/or polymeric core include amine groups, epoxide groups, hydroxyl groups, thiol groups, carbamate groups, amide groups, urea groups, isocyanate groups (including blocked isocyanate groups), aldo groups, keto groups, ethylenically unsaturated groups, and combinations thereof. For instance, the polymeric shell can also comprise hydroxyl functional groups in addition to the carboxylic acid functional groups. It is appreciated that the polymeric shell, polymeric core, or both can be free of (i.e., does not contain) any of the previously described functional groups, such as being free of aldo groups and keto groups.

The carboxylic acid functional polymeric core-shell particles are prepared with various components. For example, the carboxylic acid core-shell particles can be formed from isocyanate functional polyurethane prepolymers, ethylenically unsaturated monomers, polyols, and/or polyamines. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, and carboxylic acids.

Non-limiting examples of suitable polyisocyanates and hydroxyl functional ethylenically unsaturated components include any of the compounds previously described.

Non-limiting examples of polyols include glycols, polyether polyols, polyester polyols, copolymers thereof, and combinations thereof. Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof.

Non-limiting examples of acid containing diols include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof.

The carboxylic acid functional core-shell particles can have various shapes (or morphologies) and sizes such as the shapes and sizes previously described and are prepared to provide a hydrophilic polymeric shell with enhanced water-dispersibility/stability and a hydrophobic polymeric core so that the polymeric shell at least partially encapsulates the hydrophobic core. Further, the carboxylic acid functional groups can be at least partially neutralized (i.e., at least 30% of the total neutralization equivalent) by a base, such as a volatile amine, to form a salt group as previously described. The polymeric shell is also covalently bonded to at least a portion of the polymeric core such as by reacting ethylenically unsaturated groups from the polymeric shell and the polymeric core.

The carboxylic acid functional polymeric core-shell particles of the first coating composition can comprise at least 0.1 weight %, or at least 0.5 weight %, or at least 1 weight %, or at least 5 weight %, or at least 10 weight %, based on the total resin solids weight of the coating composition that forms the first basecoat layer. The carboxylic acid functional polymeric core-shell particles of the first coating composition can also comprise 20 weight % or less, or 15 weight % or less, or 12 weight % or less, based on the total resin solids weight of the coating composition that forms the first basecoat layer. The carboxylic acid functional polymeric core-shell particles of the first coating composition can comprise an amount ranging from 0.1 weight % to 20 weight %, or from 0.5 weight % to 15 weight %, or from 1 weight % to 10 weight %, based on the total resin solids weight of the coating composition that forms the first basecoat layer.

It is appreciated that the first coating composition can comprise both types of the previously described polymeric core-shell particles. That is, the first coating composition can comprise at least one or both of the previously described types of polymeric core-shell particles.

The coating composition that forms the first basecoat layer can further comprise additional materials including, but not limited to, additional resins such as additional film-forming resins. As used herein, a "film-forming resin" refers to a resin that when used in a coating composition can form a self-supporting continuous film on at least a horizontal surface through dehydration and/or upon curing. The term "dehydration" refers to the removal of water and/or other solvents. It is appreciated that dehydration can also cause at least partial curing of a resinous material. The coating composition comprising the additional resin can be dehydrated and/or cured at ambient conditions, with heat, or with other means such as actinic radiation as previously described. Further, "ambient conditions" refers to the conditions of the surrounding environment (e.g., the temperature, humidity, and pressure of the room or outdoor environment in which the substrate is located such as, for example, at a temperature of 23° C. and at a relative humidity in the air of 35% to 75%).

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating and can be soluble in certain solvents.

Non-limiting examples of suitable additional resins include polyurethanes, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include particulate and non-particulate resins.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. Alternatively, a thermosetting film-forming resin can be used having functional groups that are reactive with themselves; in this manner, such thermosetting resins are self-crosslinking.

The coating composition that forms the first basecoat layer can further include one or more additional crosslinkers other than the free polyisocyanate. As used herein, a "crosslinking agent", "crosslinker", and like terms refers to a molecule comprising two or more functional groups that are reactive with other functional groups and which is capable of linking two or more monomers or polymer molecules through chemical bonds. Non-limiting examples of additional crosslinkers include polyhydrazides, carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof. For example, the coating composition that forms the first coating layer can further comprise an aminoplast resin such as a melamine-formaldehyde resin. The coating compositions of the present invention can also be free of any one or all of the additional film-forming resins and/or crosslinkers such as being free of polyhydrazides.

The coating composition that forms the first basecoat layer can also include other additional materials such as a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating composition by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896, commercially available from Evonik Industries (Essen, Germany), CHARISMA COLORANTS and MAXITONER INDUSTRIAL COLORANTS, commercially available from Accurate Dispersions Division of Eastman Chemical Company (South Holland, IL).

The colorant which can be used with the coating composition that forms the first basecoat layer can also comprise a special effect composition or pigment. As used herein, a "special effect composition or pigment" refers to a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Non-limiting examples of special effect compositions can include transparent coated mica and/or synthetic mica, coated silica, coated alumina, aluminum flakes, a transparent liquid crystal pigment, a liquid crystal coating, and combinations thereof.

Other non-limiting examples of further materials that can optionally be used with the coating composition that forms the first basecoat layer include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

It is appreciated that the components of the first coating composition described herein are dispersed in an aqueous medium. As used herein, an "aqueous medium" refers to a liquid medium comprising greater than 50 weight % water, based on the total weight of the liquid medium. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The first coating composition can be applied directly or indirectly over at least a portion of the substrate by any means standard in the art, such as spraying, electrostatic spraying, dipping, rolling, brushing, and the like.

The substrate over which the first coating composition may be applied includes a wide range of substrates. For example, the coating composition of the present invention can be applied to a vehicle substrate, an industrial substrate, an aerospace substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The first coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The first coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate can be metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly (ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated in some manner, such as to impart visual and/or color effect, a protective pretreatment or other coating layer, and the like.

The coatings of the present invention are particularly beneficial when applied to a metallic substrate. For example, the coatings of the present invention are particularly beneficial when applied to metallic substrates that are used to fabricate automotive vehicles, such as cars, trucks, and tractors.

After applying the first coating composition, the second coating composition can then be applied directly over at least a portion of the first coating composition as a wet-on-wet process, (i.e. prior to dehydration of the first coating composition), or the second coating composition can be applied after the first coating composition is dehydrated. The second coating composition can be applied by any means standard in the art, such as spraying, electrostatic spraying, dipping, rolling, brushing, and the like.

The second coating composition that forms the second basecoat layer comprises at least one type, such as at least both types, of the previously described core-shell particles. For example, the second coating composition that forms the second basecoat layer can comprise the previously described carboxylic acid functional polymeric core-shell particles that comprise a polymeric core comprising an addition polymer derived from ethylenically unsaturated monomers and a polymeric shell comprising urethane linkages and carboxylic acid functional groups. It is appreciated that the carboxylic acid functional polymeric core-shell particles are obtained from the materials previously described and include any of the characteristics previously described with respect to the carboxylic acid functional polymeric core-shell particles. For instance, the polymeric shell can also comprise hydroxyl functional groups in addition to the carboxylic acid functional groups.

The carboxylic acid functional polymeric core-shell particles of the second coating composition can comprise greater than 20 weight %, greater than 25 weight %, or greater than 30 weight %, based on the total resin solids weight of the coating composition that forms the second basecoat layer. The carboxylic acid functional polymeric core-shell particles of the second coating composition can also comprise up to 60 weight %, up to 50 weight %, or up to 45 weight %, based on the total resin solids weight of the coating composition that forms the second basecoat layer. The carboxylic acid functional polymeric core-shell particles of the second coating composition can further comprise an amount ranging from 20 weight % to 60 weight %, or from 25 weight % to 50 weight %, or from 30 weight % to 45 weight %, based on the total resin solids weight of the coating composition that forms the second basecoat layer.

The core-shell particles used in the second coating composition can also be selected from the previously described hydroxyl functional core-shell particles in which a polymeric core and a polymeric shell of the hydroxyl functional core-shell particles each independently comprise an addition polymer derived from ethylenically unsaturated monomers. The hydroxyl functional polymeric core-shell particles are obtained from the materials previously described and include any of the characteristics previously described with respect to the hydroxyl functional polymeric core-shell particles of the first coating composition. For instance, the polymeric shell can also comprise carboxylic acid functional groups in addition to the hydroxyl functional groups.

It is appreciated that the second coating composition can comprise both types of the previously described polymeric core-shell particles. That is, the second coating composition can comprise at least one or both of the previously described types of polymeric core-shell particles.

The second coating composition can also comprise any of the previously described additional resins, crosslinkers, colorants, and/or other optional materials. For instance, the second coating composition can further comprise a free polyisocyanate and/or an aminoplast such as a melamine-formaldehyde resin. Alternatively, the second coating composition can be free of any one or all of the previously described additional components such as being free of free polyisocyanate or free of an aminoplast such as a melamine-formaldehyde resin or free of polyhydrazides. It is appreciated that the components of the second coating composition described herein are dispersed in an aqueous medium.

The second coating composition can comprise components that form a one-component composition. A one-component composition is also referred to as a one-package system or a 1K system. As used herein, a "one-component composition" refers to a composition wherein all the coating components are maintained in the same container after manufacture, during storage, etc. In contrast, a multi-component composition, such as a two component composition ("2K") or more, has at least two components that are maintained in different containers after manufacture, during storage, etc. prior to application and formation of the coating over a substrate. Thus, the second coating composition can be free of components that are typically used to form a multi-component composition, such as being free of free polyisocyanates for example. It is appreciated that the first coating composition contains free polyisocyanates and is a multi-component composition, such as a two component composition ("2K").

A one-component composition is typically cured at elevated temperatures, such as for 1 to 30 minutes at 250° F. to 450° F. (121° C. to 232° C.). However, it was found that the second coating composition can be a one-component composition but which is cured at lower temperatures due to the compositional make-up of the first coating layer and the topcoat layer.

As previously described, the first coating composition can be applied directly or indirectly over at least a portion of the substrate, followed by the second coating composition that is directly applied before or after dehydrating the first coating composition. When the second coating composition is applied before the first coating composition is dehydrated, the first and second coating compositions can be dehydrated simultaneously at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating compositions can be dehydrated at the above temperatures for a period of time of less than 15 minutes, less than 10 minutes, less than 5 minutes, less than 2 minutes, or less than 1 minute. The period of time for dehydrating the coating composition is the designated period of time for dehydration and does not include the time it takes to transfer and subject the coating composition to another step such as a curing step.

The second basecoat composition can also be applied directly over at least a portion of the first basecoat layer that has been dehydrated as previously described. The second basecoat composition can then be dehydrated at ambient temperatures (e.g. 20° C.) to 90° C., or from ambient temperatures to 80° C., or from ambient temperatures to 70° C., or from ambient temperatures to 60° C., or from 40° C. to 80° C., or from 40° C. to 70° C. The coating compositions can be dehydrated at the above temperatures for a period of time of less than 15 minutes, less than 10 minutes, less than 5 minutes, less than 2 minutes, or less than 1 minute.

The first and second basecoats taken together after dehydration can have a high solids content. For instance, the first and second basecoats taken together after dehydration can comprise a solids content of at least 80 weight %, based on the total weight of the first and second basecoats.

After dehydrating the second coating composition, the basecoats can be cured at temperatures of 120° C. or less, or 100° C. or less, or 80° C. or less. The terms "curable", "cure", and the like, mean that at least a portion of the resinous materials in a composition is crosslinked or cross-linkable. Cure, or the degree of cure, can be determined by dynamic mechanical thermal analysis (DMTA) using a MK III DMTA analyzer, manufactured by Polymer Laboratories (Loughborough, United Kingdom), conducted under nitrogen. The degree of cure can for example be at least 10%, such as at least 30%, such as at least 50%, such as at least 70%, or at least 90% of complete crosslinking as determined by the analysis mentioned above.

It was found that the coatings of the present invention can be formed at lower dehydration/cure temperatures than those typically required in other coatings commonly applied to automotive substrates. As such, the coatings of the present invention help reduce costs and speed up the overall coating process.

The multi-layer coating also comprises a topcoat layer that is directly applied over at least a portion of the second basecoat layer before or after curing the basecoat layers. The topcoat layer is formed from a coating composition that comprises a film-forming resin and a free polyisocyanate reactive with the film-forming resin. It is appreciated that the coating composition that forms the topcoat layer contains free polyisocyanates and is a multi-component composition, such as a two component composition ("2K").

The film-forming resin, for example, can include any of the film-resins previously described. For instance, the film-forming resin can comprise a polyol based film-forming resin. Non-limiting examples of film-forming resins can also include the film-forming resins available in the commercially available product from PPG Industries, Inc. (Pittsburgh, PA) under the tradenames CERAMICLEAR.

It is appreciated that the free polyisocyanates used in the coating composition that forms the topcoat layer can include any of the previously described polyisocyanates. The coating composition that forms the topcoat layer can comprise one or more, such as at least two different, free polyisocyanates.

The topcoat layer used with the multi-layer coating of the present invention can be a clear topcoat layer. As used herein, a "clear coat layer" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clear topcoat layer can comprise colorants, such as pigments, provided that the colorants do not interfere with the desired transparency of the clear topcoat layer. Alternatively, the clear topcoat layer is free of colorants such as pigments (i.e., unpigmented).

As indicated, the topcoat layer can be cured simultaneously with the first and second basecoat layers. For instance, the topcoat layer and basecoat layers can be simultaneously cured at temperatures of 120° C. or less, or 100° C. or less, or 80° C. or less.

The multi-layer coating according to the present invention can also comprise other optional layers including, but not limited to, additional basecoat layers as well as a primer coating layer as indicated above. As used herein, a "primer coating layer" refers to an undercoating that may be deposited onto a substrate in order to prepare the surface for application of a protective or decorative coating system. The primer coating layer can be formed over at least a portion of the substrate and the first or second basecoat layer can be formed over at least a portion of the primer coating layer. Further, the additional basecoat layers can be prepared from any of the core-shell particles and other materials previously described. The additional basecoat layers can be applied, for example, over the first or second basecoat layer before applying the topcoat layer.

The primer coating layer optionally used with the multi-layer coating of the present invention can be formed from a coating composition that comprises a film-forming resin such as a cationic based resin, an anionic based resin, and/or any of the additional film-forming resins previously described. The coating composition used to form the primer coating composition can also include the previously described crosslinkers, colorants, and other optional materials.

Additionally, the primer coating composition can include a corrosion inhibitor. As used herein, a "corrosion inhibitor" refers to a component such as a material, substance, compound, or complex that reduces the rate or severity of corrosion of a surface on a metal or metal alloy substrate. The corrosion inhibitor can include, but is not limited to, an alkali metal component, an alkaline earth metal component, a transition metal component, or combinations thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), chromium (Cr), and zinc (Zn), among various others.

Specific non-limiting examples of inorganic components that act as a corrosion inhibitor include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

As indicated, the primer coating composition can be deposited directly over at least a portion of a substrate before application of the first or second basecoat composition and dehydrated and/or cured to form the primer coating layer. The primer coating composition of the present invention can be applied by any means standard in the art, such as electrocoating, spraying, electrostatic spraying, dipping, rolling, brushing, and the like. Once the primer coating composition is applied to at least a portion of the substrate, the composition can be dehydrated and/or cured to form the primer coating layer. The primer coating composition can be dehydrated and/or cured, for example, at a temperature of 175° C. to 205° C. to form the primer coating layer.

It was found that the multi-layer coatings of the present invention can be formed at lower dehydration/cure temperatures than those typically required in other coatings commonly applied to automotive substrates. As such, the multi-layer coatings of the present invention help reduce costs, eliminate the amount of coating equipment, and speed up the overall coating process.

The present invention is also directed to a process of preparing a multi-layer coating. The process includes: forming a first basecoat layer over at least a portion of a substrate by depositing a first coating composition onto at least a portion of the substrate; and forming a second basecoat layer over at least a portion of the first basecoat layer by depositing a second coating composition directly onto at least a portion of: (1) the first basecoat layer after the first coating composition is dehydrated; or (2) the first coating composition before the first basecoat composition is dehydrated. The first and second basecoat compositions can be dehydrated separately or simultaneously and then cured as previously described. A topcoat layer is formed over at least a portion of the second basecoat layer by depositing a topcoat composition (e.g., directly) onto at least a portion of the second basecoat layer. The basecoat layers and topcoat layer can be cured simultaneously or separately.

The substrate can optionally comprise a primer coating layer and the first basecoat layer is applied over at least a portion of the primer coating layer by depositing a first basecoat composition directly onto at least a portion of the primer coating layer. The primer coating layer can be formed by depositing a primer coating composition, such as by electrodepositing an electrodepositable coating composition, onto at least a portion of the substrate prior to depositing the first basecoat composition.

The multi-coatings can be applied to any kind of substrate as described above, such as for example to automotive parts in an automotive assembly plant. In some examples, during application of the multi-layer coating in an automotive assembly plant, a metal substrate is, optionally, first passed to an electrodeposition station where the primer coating composition is electrodeposited over the metal substrate and dehydrated and/or cured. The first basecoat composition is then directly applied over the electrodeposited coating layer or, alternatively, directly applied over at least a portion of the substrate in a basecoat zone comprising one or more coating stations. The basecoat zone can be located downstream of and adjacent to an electrodeposition oven. The first basecoat station has one or more conventional applicators, e.g., bell or gun applicators, connected to or in flow communication with a source of the first basecoat composition. The first basecoat composition can be applied, e.g., sprayed, over the substrate by one or more applicators at the first basecoat station in one or more spray passes to form a first basecoat layer over the substrate.

The first basecoat can be dehydrated with a conventional drying device, such as an oven, located downstream of and/or adjacent to the second coating station and/or the first coating station. After applying the second basecoat composition, the second basecoat layer can be dehydrated separately if the first basecoat layer has been previously dehydrated. Alternatively, when the second basecoat composition is applied wet-on-wet to the first basecoat composition, both basecoat compositions can be simultaneously dehydrated. The basecoats can then be cured using an oven.

After the first basecoat composition and second basecoat composition have been dehydrated and/or cured, the topcoat layer is applied over the basecoat layer(s) at a topcoat station. The topcoat station includes one or more conventional applicators, e.g., bell applicators, connected to and in flow communication with a source of the topcoat composition. An oven is located downstream of and/or adjacent to the topcoat station to dehydrate and/or cure the topcoat composition separately or simultaneously with the basecoats.

A non-limiting example of an automotive assembly plant for applying a multi-layer coating is described in U.S. Pat. No. 8,846,156 at col. 3 line 1 to col. 4 line 43 and FIG. 1, which is incorporated by reference herein.

The present invention also includes the following aspects.

A first aspect is directed to a multi-layer coating system comprising: (i) a first basecoat layer formed from a first coating composition comprising at least one free polyisocyanate having a weight average molecular weight of less than 600 g/mol and hydroxyl functional polymeric core-shell particles, wherein a polymeric core and a polymeric shell of the hydroxyl functional core-shell particles each independently comprise an addition polymer derived from ethylenically unsaturated monomers and wherein an amount of free polyisocyanate having a weight average molecular weight of less than 600 g/mol is 3.5 weight or greater, based on the total resin solids of the first coating composition; (ii) a second basecoat layer positioned over at least a portion of the first basecoat layer, the second basecoat layer formed from a second coating composition comprising carboxylic acid functional polymeric core-shell particles, wherein a polymeric core of the carboxylic acid functional core-shell particles comprises an addition polymer derived from ethylenically unsaturated monomers and a polymeric shell of the carboxylic acid functional core-shell particles comprises urethane linkages and carboxylic acid functional groups; and (iii) a topcoat layer positioned over at least a portion of the second basecoat layer, the topcoat layer formed from a top coat coating composition comprising a free polyisocyanate and a film-forming resin reactive with the free polyisocyanate.

A second aspect is directed to the multi-layer coating system of the first aspect, wherein the free polyisocyanate in the coating composition that forms the first basecoat layer comprises greater than 9.5 weight % of a uretdione dimer, based on the total resin solids weight of all the free polyisocyanate in the coating composition that forms the first basecoat layer.

A third aspect is directed to the multi-layer coating system of the first or second aspects, wherein the polymeric shell of the hydroxyl functional polymeric core-shell particles of the first coating composition comprises from 5 to 30 weight % of the core-shell particles, based on the total solids weight of the core-shell particles.

A fourth aspect is directed to the multi-layer coating system of any one of the first through third aspects, wherein the polymeric shell of the hydroxyl functional polymeric core-shell particles of the first coating composition are obtained from components that comprise greater than 10 weight % of a hydroxyl functional ethylenically unsaturated monomer, based on the total weight of the components that form the polymeric shell.

A fifth aspect is directed to the multi-layer coating system of the fourth aspect, wherein a homopolymer formed from the hydroxyl functional ethylenically unsaturated monomer has a Van Krevelen solubility parameter at 298K of greater than 25.0 MPa$^{0.5}$.

A sixth aspect is directed to the multi-layer coating system of any one of the first through fifth aspects, wherein the first coating composition further comprises carboxylic acid functional polymeric core-shell particles, wherein a polymeric core of the carboxylic acid functional polymeric core-shell particles comprises an addition polymer derived from ethylenically unsaturated monomers and a polymeric shell of the carboxylic acid functional polymeric core-shell particles comprises urethane linkages and carboxylic acid functional groups.

A seventh aspect is directed to the multi-layer coating system of any one of the first through sixth aspects, wherein the first coating composition and/or the second coating composition further comprises an aminoplast resin.

An eighth aspect is directed to the multi-layer coating system of any one of the first through third aspects, wherein the second coating composition comprises greater than 20 weight % of the carboxylic acid functional polymeric core-shell particles, based on a total resin solids of the second coating composition.

A ninth aspect is directed to the multi-layer coating system of any one of the first through eighth aspects, wherein the second coating composition further comprises hydroxyl functional polymeric core-shell particles, wherein a polymeric core and a polymeric shell of the hydroxyl functional polymeric core-shell particles of the second coating composition each independently comprise an addition polymer derived from ethylenically unsaturated monomers.

A tenth aspect is directed to the multi-layer coating system of any one of the first through ninth aspects, wherein the second coating composition further comprises a free polyisocyanate.

An eleventh aspect is directed to the multi-layer coating system of any one of the first through tenth aspects, wherein the first coating composition and the second coating composition each independently comprise at least one colorant.

A twelfth aspect is directed to the multi-layer coating system of any one of the first through eleventh aspects, wherein a weight ratio of the core to the shell of the hydroxyl core-shell particles of the first coating composition is from 95:5 to 70:30.

A thirteenth aspect is directed to the multi-layer coating system of any one of the first through twelfth aspects, further comprising a primer coating layer, wherein the first coating layer is positioned over at least a portion of the primer coating layer.

A fourteenth aspect is directed to a substrate at least partially coated with the multi-layer coating system of any one of the first through thirteenth aspects.

A fifteenth aspect is directed to the substrate of the fourteenth aspect, wherein the substrate comprises at least a portion of an automobile.

A sixteenth aspect is directed to a process of coating a substrate with a multi-layer coating comprising: (i) depositing a first coating composition onto at least a portion of the substrate (ii) depositing a second coating composition directly onto at least a portion of the first coating composition (1) after the first coating composition is dehydrated or (2) before the first coating composition is dehydrated; (iii) dehydrating: (a) the second coating composition after (ii)(1); or (b) simultaneously the first coating composition and the second coating composition after (ii)(2); and (iv) depositing a topcoat coating composition over at least a portion of the dehydrated second basecoat composition, wherein the first coating composition, the second coating composition and the topcoat coating composition are defined as in any of aspects 1 to 15.

A seventeenth aspect is directed to a process of the sixteenth aspect, wherein the first coating composition is dehydrated before application of the second basecoat composition.

An eighteenth aspect is directed to the process of the sixteenth or seventeenth aspects, wherein both the first and second coating compositions are simultaneously dehydrated.

A nineteenth aspect is directed to the process of any one of the sixteenth through eighteenth aspects, wherein, after dehydration, the first and second basecoats together comprise a solids content of at least 80 weight %, based on the total weight of the first and second basecoats.

A twentieth aspect is directed to the process of any one of the sixteenth through nineteenth aspects, further comprising curing the first and second coating compositions at a temperature of 120° C. or less.

A twenty first aspect is directed to the process of any one of the sixteenth through nineteenth aspects, further comprising curing the first and second coating compositions and the topcoat composition simultaneously at a temperature of 120° C. or less.

The following examples are presented to demonstrate the general principles of the invention. The invention should not be considered as limited to the specific examples presented. All parts and percentages in the examples are by weight unless otherwise indicated.

Example 1

Preparation of a Polyurethane-Acrylic Dispersion

A polyurethane was first prepared by charging the following components in order into a first kettle reactor fitted with baffles, thermocouple, mechanical stirrer, and condenser: 698.8 g of butyl acrylate, 32.3 g of 1,4-butanediol, 1500 g of a polyester having hydroxyl equivalence of 85 (the polyester was prepared by reacting 4.9 parts of maleic anhydride, 22.2 parts of adipic acid, 25.7 parts of isophthalic acid and 100 parts of 1, 6-hexanediol), 193.6 g of dimethylolpropionic acid, 58.4 g of triethylamine, 2.3 g of butylated hydroxytoluene, and 2.3 g of triphenyl ester phosphorous acid. The mixture was heated to 55° C. and held for 15 minutes. Next, 522.8 g of isophorone diisocyanate was charged into the reactor over 20 minutes. The isocyanate-adding funnel was rinsed with 52.3 g of butyl acrylate. The temperature of the reaction mixture was held at 90° C. until there was no NCO peak by IR characterization, and the reaction mixture was cooled to 60° C.

A second kettle reactor fitted with baffles, thermocouple, mechanical stirrer, and condenser was charged with 5511.2 g of deionized water and 36.6 g of dimethylethanolamine, and heated to 85° C. Next, 95% of the contents of the first kettle reactor were added to the second kettle reactor over a 20 minute period. The mixture was kept at 85° C. and a nitrogen atmosphere was established and maintained in the reactor for the remainder of the reaction. A monomer mixture of 2090 g of butyl acrylate, 216.2 g of hydroxypropyl methacrylate and 216.2 g of ethylene glycol dimethacrylate was added into the kettle over 20 minutes. Then 1.3 g of t-butyl hydroperoxide (70%) in 128.6 g of water were added to the reactor and cooled down to 30° C., followed by a 30 minute addition of a dissolution of 5.1 g of sodium metabisulfite and 0.1 g of ferrous ammonium sulfate in 154.2 g of water. The temperature rose exothermically to 65-70° C. When the temperature started to decrease the set point, the reaction was changed to 30° C. and held for 30 min. The mixture was cooled to 30° C.

The resulting dispersion included particles comprising a polyurethane shell covalently bonded to an acrylic core. The final dispersion had a Brookfield viscosity of ~197 centipoise, a pH of 7.79, and a nonvolatile content of 46.7%. Brookfield viscosity was measured at 25° C. on a Brookfield Viscometer DV-II+Pro, manufactured by Brookfield Engineering (Middleboro, MA), using spindle #3 at 100 RPM. Non-volatile content was measured by comparing initial sample weights to sample weights after exposure to 110° C. for 1 hour. The pH was measured at room temperature (20° C.-27° C.) using a Fisherbrand accumet AE150 Benchtop pH meter, manufactured by Thermo Fisher Scientific (Waltham, MA).

Example 2

Preparation of an Acrylic Latex

An acrylic latex was prepared from the components listed in Table 1.

TABLE 1

| Component | Amount (grams) |
|---|---|
| Charge A | |
| Deionized water | 778.0 |
| RHODAPEX AB/20[1] | 2.1 |
| Charge B | |
| Butyl acrylate | 1.32 |
| Methyl methacrylate | 8.92 |
| Methacrylic acid | 0.28 |
| Deionized water | 11.2 |
| Charge C | |
| Deionized water | 4.4 |
| Ammonium persulfate | 0.1 |

TABLE 1-continued

| Component | Amount (grams) |
|---|---|
| Charge D | |
| Deionized water | 189.4 |
| RHODAPEX AB/20[1] | 4.58 |
| Butyl methacrylate | 222.2 |
| acrylamide | 9.8 |
| Butyl acrylate | 89.3 |
| Ethylene glycol dimethacrylate | 8.2 |
| Hydroxy ethyl methacrylate | 8.2 |
| Charge E | |
| Deionized water | 74.0 |
| Ammonium persulfate | 0.27 |
| Charge F | |
| Deionized water | 28.6 |
| RHODAPEX AB/20[1] | 0.66 |
| Methyl methacrylate | 8.8 |
| Butyl acrylate | 19.3 |
| Methacrylic acid | 9.9 |
| Hydroxy ethyl acrylate | 12.9 |
| Charge G | |
| Deionized water | 54.3 |
| Borax decadydrate granular[2] | 0.44 |
| Ammonium persulfate | 0.14 |
| Charge H | |
| Deionized water | 18.1 |
| Dimethyl ethanol amine | 2.9 |
| Charge 1 | |
| Deionized water | 14.4 |
| ACTICIDE MBS[3] | 4.2 |

[1]An anionic surfactant, commercially available from Solvay (Brussels, Belgium).
[2]Borax decadydrate in granular form that is commercially available from American Borate Company (Virginia Beach, VA).
[3] Microbiocide formed of a mixture of 1, 2-benzisothiazolin-3-one and 2-methyl-4-isothiazolin-3-one, commercially available from Thor GmbH (Speyer, Germany).

Charge A was added to a four-neck round bottom flask equipped with a thermocouple, mechanical stirrer, and condenser. Charge A was heated to 65° C. The reaction mixture was then heated to 85° C. and Charge B was added, followed by addition of Charge C and then held for 30 minutes. Charges D and E were added over 180 minutes and held for 60 minutes. Charges F and G were then added over 90 minutes and held for 120 minutes before cooling to 70° C. When the temperature reached 70° C., Charge H was added over 20 minutes. The mixture was then cooled to 40° C. and diluted with Charge I and mixed for 15 minutes.

The resulting dispersion included particles comprising an acrylic shell covalently bonded to an acrylic core. The final dispersion had a solid contents of 25% (measured at 110° C. for 1 hour), a Brookfield viscosity of around 40 centipoise, and pH of 6.6, which were measured according to the procedures previously described in Example 1.

Example 3

Preparation of a Polyurethane-Acrylic Dispersion

A polyurethane was first prepared by charging the following components in order into a first kettle reactor fitted with baffles, thermocouple, mechanical stirrer, and condenser: 200 g of 2-ethylhexyl acrylate, 158.4 g of hydroxyethyl methacrylate, 811 g of poly(tetramethylene ether) glycol with a number averaged molecular weight of 1000 g/mol, 163.2 g of dimethylolpropionic acid, 8.0 g of triethylamine, 1.6 g of dibutyl tin di-laurate and 1.6 g of triphenyl ester phosphorous acid. The mixture was heated to 90° C.

and held for 15 minutes. Next, 450.8 g of isophorone diisocyanate was charged into the reactor over 90 minutes. The isocyanate-adding funnel was rinsed with 40 g of 2-ethylhexyl acrylate. The temperature of the reaction mixture was held at 90° C. until there was no NCO peak by IR characterization. The reaction mixture was cooled to 50° C. and 908 g of 2-ethylhexyl acrylate and 145 g of DOWANOL PM (commercially available from The Dow Chemical Company (Midland, MI)) were then added to the mixture before being cooled to room temperature.

A second kettle reactor fitted with baffles, thermocouple, mechanical stirrer, and condenser was charged with 4361 g of deionized water, 124.8 g of AEROSOL OT-75 (surfactant, commercially available from Cytec Industries (Woodland Park, NJ)), 85.6 g of dimethylethanolamine, 568.8 g of methyl methacrylate, 946.9 g of 2-ethylhexyl acrylate, 88.8 g of 1,6-hexenediol diacrylate, and 83% of the contents of the mixture of the first Kettle reactor. The mixture was stirred and heated to 33° C. The mixture was kept at 33° C. and a nitrogen atmosphere was established and maintained in the reactor for the remainder of the reaction. Next, 2.1 g oft-butyl hydroperoxide (70%) in 120 g of water was added to the reactor, followed by a 30 minute addition of a dissolution of 3.0 g of sodium metabisulfite and 0.1 g of ferrous ammonium sulfate in 120 g of water. The temperature rose exothermically to 65-70° C. When the temperature started to decrease, the set point of the reaction was changed to 65° C. and held for 30 min. The mixture was then cooled to 30° C.

The resulting dispersion included particles comprising a polyurethane shell covalently bonded to an acrylic core. The final dispersion had a Brookfield viscosity of ~165 centipoise, a pH of 8.48, and a nonvolatile content of 38.1%, which were measured according to the procedures previously described in Example 1.

Example 4

Preparation of a Basecoat Composition

A grey basecoat composition according to the present invention was prepared from the components listed in Table 2.

TABLE 2

| Components | Parts by weight of Component |
|---|---|
| Polyurethane-acrylic dispersion of Example 1 | 102.87 |
| Acrylic latex of Example 2 | 128.41 |
| BYK 348[4] | 0.26 |
| BYK 032[5] | 1.60 |
| SURFYNOL 104E[6] | 3.47 |
| 50% DMEA[7] | 1.59 |
| Mineral Spirits[8] | 2.60 |
| White Tint[9] | 27.63 |
| Black Tint[10] | 17.63 |
| Yellow Tint[11] | 7.86 |
| Urethane Diol[12] | 5.22 |
| DOWANOL PnB[13] | 2.60 |
| 2-ethylhexanol | 6.08 |
| 50% DMEA[7] | 1.13 |
| BYKETOL WS[14] | 6.73 |
| RESIMENE HM2608[15] | 7.02 |

TABLE 2-continued

| Components | Parts by weight of Component |
|---|---|
| CYMEL 1158[16] | 4.27 |
| Deionized Water | 27.21 |

[4]Silicone surfactant, commercially available from BYK-Chemie GmbH (Wesel, Germany).

[5]Defoamer, commercially available from Byk-Chemie GmbH (Wesel, Germany).

[6]Surfactant, commercially available from Evonik Industries (Essen, Germany).

[7]Dimethyl ethanolamine 50% aqueous solution

[8]Solvent, commercially available from Shell Chemical Company (Houston, TX).

[9]White tint paste formed from 61% $TiO_2$ dispersed in 9% acrylic polymer having a solids content of 70 wt %, where the acrylic polymer is a copolymer of 17.9 wt % of butyl methacrylate, 29.99 wt % of styrene, 34.98 wt % of butyl acrylate, 8.52 wt % of acrylic acid, and 8.52 wt % of hydroxyethyl acrylate, with a weight average molecular weight of around 100,000 g/mol and solids content of 27 wt %.

[10]Black Tint paste formed from 6% carbon black dispersed in 18% acrylic polymer and having a solids content of 24 wt %, where the acrylic polymer is a copolymer of 17.9 wt % of butyl methacrylate, 29.99 wt % of styrene, 34.98 wt % of butyl acrylate, 8.52 wt % of acrylic acid, and 8.52 wt % of hydroxyethyl acrylate, with a weight average molecular weight of around 100,000 g/mol and solids content of 27 wt %.

[11]Yellow Tint paste formed from 25% Mapico Yellow 1050A dispersed in 21% acrylic polymer and having a solids content of 46 wt %, where the acrylic polymer is a copolymer of 17.9 wt % of butyl methacrylate, 29.99 wt % of styrene, 34.98 wt % of butyl acrylate, 8.52 wt % of acrylic acid, and 8.52 wt % of hydroxyethyl acrylate, with a weight average molecular weight of around 100,000 g/mol and solids content of 27 wt %.

[12]Polyurethane diol prepared by reacting 1 mole of JEFF AMINE D-400 (commercially available from the Huntsman Corporation (The Woodlands, TX)) with 2 moles of ethylene carbonate at 130° C. as described in Example A of U.S. Pat. No. 7,288,595, which is incorporated by reference herein.

[13]Propylene glycol n-butyl ether, commercially available from The Dow Chemical Company (Midland, MI).

[14]Silicone-free surface additive, commercially available from BYK-Chemie GmbH (Wesel, Germany).

[15]Melamine formaldehyde resin, available from INEOS (London, United Kingdom).

[16]Butylated melamine-formaldehyde cross-linking agent, available from Allnex (Frankfurt, Germany).

The components listed in Table 2 were added slowly into a stirring/mixing vessel during mixing. The final coating composition had a pH of 9.1, a coatings solids content of 32 weight % and a viscosity of 90 cp as measured by BYK CAP 2000+ Viscometer, manufactured by BYK Additives and Instruments (Wesel, Germany), with Spindle #4 at a shear rate of 1000 s$^{-1}$ and 20° C.

Example 5

Preparation of a Basecoat Composition

A silver basecoat composition according to the present invention was prepared from the components listed in Table 3.

TABLE 3

| Components | Parts by weight of Component |
|---|---|
| Polyurethane-acrylic dispersion of Example 3 | 127.0 |
| Acrylic latex of Example 2 | 158.0 |
| BYK 348[4] | 0.23 |
| BYK 032[5] | 1.96 |
| SURFYNOL 104E[6] | 5.04 |
| 50% DMEA[7] | 2.50 |
| Butyl glykol[17] | 5.20 |
| SILVER ULTRA 6704[18] | 9.55 |
| TCR3070A aluminum paste[19] | 12.94 |
| Aluminum passive solution[20] | 8.44 |
| ACEMATT TS100[21] | 1.06 |
| DOW ANOL PnB[13] | 3.0 |
| 2-ethylhexanol | 14.0 |
| 50% DMEA[7] | 1.13 |

TABLE 3-continued

| Components | Parts by weight of Component |
|---|---|
| RESIMENE HM2608[15] | 11.1 |
| Deionized Water | 100.21 |

[17]Ethylene glycol monobutyl ether, commercially available from BASF (Ludwigshafen, Germany).

[18]Silver dollar aluminum pigment, commercially available from Silberline Manufacturing Co. Inc. (Leven, United Kingdom).

[19]Aluminum Paste, commercially available from Toyal America Inc. (Lockport, IL).

[20]Aluminum passivator solution, including a mixture of 35.45 parts of 2-butoxyethanol (commercially available from the Dow Chemical Company (Midland, MI)), 60.25 parts of LUBRIZOL 2062 (commercially available from Lubrizol (Wickliffe, OH)), and 1.30 parts of dimethyl ethanolamine.

[21]Untreated thermal silica, available from Evonik Industries (Essen, Germany).

The components listed in Table 3 were added slowly into a stirring/mixing vessel during mixing. The final coating composition had a pH of 9.1, a coatings solids content of 31 weight % and a viscosity of 70 cp as measured by BYK CAP 2000+ Viscometer, manufactured by BYK Additives and Instruments (Wesel, Germany), with Spindle #4 at a shear rate of 1000 s$^{-1}$ and 20° C.

Examples 6-8

Preparation of Polyisocyanate Components

Several polyisocyanate mixtures were prepared with the components listed in Table 4.

TABLE 4

| Example | BAYHYDUR 401-70[22] (grams) | DESMODUR N-3300A[23] (grams) | DESMODUR N-3400[24] (grams) | PROGLYDE DMM[25] (grams) |
|---|---|---|---|---|
| 6 | 37.5 | 12.8 | 15.7 | 18 |
| 7 | 30 | 15.2 | 18.6 | 19 |
| 8 | 25 | 16.7 | 20.5 | 21 |

[22]Hydrophilically modified aliphatic polyisocyanate based on isophorone diisocyanate (IPDI), commercially available from Covestro (Leverkusen, Germany).
[23]Aliphatic polyisocyanate (HDI trimer), commercially available from Covestro (Leverkusen, Germany).
[24]Aliphatic polyisocyanate (HDI uretdione), commercially available from Covestro (Leverkusen, Germany).
[25]Dipropylene glycol dimethyl ether, commercially available from The Dow Chemical Company (Midland, MI).

The components in each example in Table 4 were added slowly in a stirring/mixing vessel until a homogeneous solution was made at 20° C. The isocyanate mixture of each sample was analyzed by the described gel permeation chromatography technique.

Example 9

Preparation of a Topcoat Composition

A topcoat composition was prepared from a two component polyol-polyisocyanate crosslinkable composition based on 2K CERAMICLEAR repair clearcoat (Commercially available from PPG Industries, Inc. (Pittsburgh, PA)) in which the polyisocyanate component was replaced with the mixture prepared from the components listed in Table 5.

TABLE 5

| DESMODUR N-3300A[23] (grams) | DESMODUR N-3400[24] (grams) | n-amyl acetate (grams) | n-butyl acetate (grams) | AROMATIC 100[26] (grams) | 10% dibutyl tin di-lau-rate in Xylene (grams) |
|---|---|---|---|---|---|
| 27.64 | 16.92 | 8 | 6 | 4 | 0.5 |

[26]Solvent, commercially available from Shell Chemical Company (Houston, TX).

The components in Table 5 were added slowly in a stirring/mixing vessel until a homogeneous solution was made at 20° C. The isocyanate mixture was analyzed by the described gel permeation chromatography technique.

Examples 10-12

Preparation of Multi-Layer Coatings

Several multi-layer coatings were prepared from the components listed in Table 6.

TABLE 6

| | Composition of First Basecoat | | | | | | |
|---|---|---|---|---|---|---|---|
| Ex. | Component 1 | Component 2 | Mass ratio of Comp. 1:2 | Wt. % of free NCO with Mw of less than 600 g/mol [27] | Composition of second basecoat | Composition of clear topcoat Part A | Part B |
| 10* | Example 4 | Example 6 | 5:1 | 3.0 | Example 5 | Polyol [28] | Ex. 9 |
| 11* | Example 4 | Example 7 | 5:1 | 3.3 | Example 5 | Polyol [28] | Ex. 9 |
| 12 | Example 4 | Example 8 | 5:1 | 3.6 | Example 5 | Polyol [28] | Ex. 9 |

[27] Amount of free polyisocyanate having a weight average molecular weight of less than 600 g/mol, based on total resin solids of the coating composition. The weight average molecular weight was determined led by gel permeation chromatography relative to linear polystyrene standards of 800 to 900,000 Da using a Waters 2695 separation module with a Waters 2414 differential refractometer (RI detector), manufactured by the Waters Corporation (Milford, MA). Tetrahydrofuran (THF) was used as the eluent at a flow rate of 1 ml min-1, and two PLGEL MIXED-C ( 300 x 7.5 mm) columns, manufactured by Agilent Technologies (Santa Clara, CA), were used for separation at room temperature.
[28] Polyol based on 2K CERAMICLEAR, commercially available as BMW A-B204134 from PPG Industries, Inc. (Pittsburgh, PA).

Each multi-layer coating was prepared by spraying their respective first and second basecoat compositions over 4 inch by 12 inch steel panels that were pre-coated with an ED 6465 electrocoat (an electrocoat commercially available from PPG Industries, Inc. (Pittsburgh, PA)). The basecoat compositions were applied under controlled environmental conditions of 70-75° F. (21-24° C.) and 60-65% relative humidity. Further, the first basecoat was made by mixing Component 1 and Component 2 right before spray, and was applied in one coat, then flashed at ambient temperature for five minutes. The film thickness of the first basecoat was 18-20 microns.

Next, the second basecoat compositions of each multi-layer coating were applied in two coats, with a 90 second ambient flash between coats, and then flashed at ambient temperature for 4 minutes and dehydrated for 7 minutes at 70° C. The film thickness of the second basecoats were 14-16 microns.

After forming the basecoat layers, the clear topcoat was made by mixing Part A and Part B, and then applied over the basecoated panels in two coats with a 90 seconds ambient flash between coats. The mixing ratio of Part A to Part B was 2:1 by weight. The coated panels were allowed to flash for 10 minutes at ambient conditions and baked for 30 minutes at 80° C. The dry film thickness of the clear topcoats were 50-55 microns. The basecoats and clear topcoat were sprayed using BINKS Model 95 spray gun, manufactured by Carlisle Fluid Technologies (Scottsdale, AZ), with an automatization air pressure at 60 psi.

Example 13

Evaluation of Multi-Layer Coatings

The distinctness of image (DOI) of the final films were measured with BYK Wavescan instrument (manufactured by BYK Gardner USA (Columbia, MD)). The humidity resistance of the final baked films was checked by putting the final baked panels in the 63° C. water bath for 2 days. DOI was measured before the humidity test and after being taken out of the water bath and recovered at room temperature for 24 hours. DOI loss % is defined as (DOI at 24 hours recovery–DOI before humidity)/DOI before humidity. The lower value of DOI loss %, the better humidity resistance of the multi-layer coating.

The results of the DOI testing are shown in Table 7.

TABLE 7

| Multi-layer coating Example | DOI loss % at 24 hours after recovering from humidity test |
|---|---|
| Comparative Example 10 | 38 |
| Comparative Example 11 | 30 |
| Example 12 | 15 |

As shown in Table 7, Example 12, which included a first basecoat prepared with 3.6 weight % of an isocyanate having a weight average molecular weight less than 600 g/mol, exhibited significantly less DOI loss % as compared to Comparative Examples 10 and 11, which included first basecoats prepared with 3.0 weight % and 3.3 weight %, respectively, of an isocyanate having a weight average molecular weight less than 600 g/mol. As such, the DOI loss % is correlated with weight % of isocyanate having a weight average molecular weight less than 600 g/mol based on total resin solids in the coating composition that forms the first basecoat layer.

Whereas particular embodiments of this invention have been described above for purposes of illustration, it will be evident to those skilled in the art that numerous variations of the details of the present invention may be made without departing from the invention as defined in the appended claims.

The invention claimed is:

1. A multi-layer coating system comprising:

1) a first basecoat layer formed from a first coating composition comprising:

a) at least two different free polyisocyanates comprising:

i) a free aliphatic polyisocyanate having a weight average molecular weight of less than 600 g/mol, present in an amount of 3.5 to 8 weight %, based on the total resin solids of the first coating composition; and ii) a uretdione dimer different from the free aliphatic polyisocyanate i), present in an amount greater than 9.5 weight %, based on the total resin solids of all the free polyisocyanate in the first coating composition;

b) at least two different types of polymeric core-shell particles comprising:

i) hydroxyl functional polymeric core-shell particles, wherein a polymeric core and a polymeric shell of the hydroxyl functional core-shell particles each independently comprise an addition polymer derived from ethylenically unsaturated monomers, wherein the hydroxyl functional polymeric core-shell particles are present in the first coating composition in an amount of 20 to 60 percent by weight, based on the total weight of resin solids of the first coating composition; and ii) carboxylic acid functional polymeric core-shell particles, wherein a polymeric core of the carboxylic acid functional core-shell particles comprises an addition polymer derived from ethylenically unsaturated monomers including a monomer having at least two ethylenically unsaturated groups and a polymeric shell of the carboxylic acid functional core-shell particles comprises urethane linkages and carboxylic acid functional groups, wherein the carboxylic acid functional polymeric core-shell particles are present in the first coating composition in an amount of 0.1 to 20 percent by weight, based on the total weight of resin solids of the first coating composition; and c) a crosslinking agent different from the free polyisocyanates a);

2) a second basecoat layer positioned over at least a portion of the first basecoat layer, the second basecoat layer formed from a second coating composition comprising:

a) second carboxylic acid functional polymeric core-shell particles, wherein a polymeric core of the second carboxylic acid functional core-shell particles comprises an addition polymer derived from ethylenically unsaturated monomers and a polymeric shell of the second carboxylic acid functional core-shell particles comprises urethane linkages and carboxylic acid functional groups, wherein the second carboxylic acid functional polymeric core-shell particles are present in the second coating composition in an amount of greater than 20 and up to 60 percent by weight, based on the total weight of resin solids of the second coating composition; and b) a second crosslinking agent; and 3) a topcoat layer positioned over at least a portion of the second basecoat layer, the topcoat layer formed from a topcoat coating composition comprising a second free polyisocyanate and a film-forming resin reactive with the second free polyisocyanate.

2. The multi-layer coating system of claim 1, wherein the polymeric shell of the hydroxyl functional polymeric core-shell particles in the first coating composition comprises from 5 to 30 weight % of the core-shell particles, based on the total solids weight of the core-shell particles.

3. The multi-layer coating system of claim 1, wherein the polymeric shell of the hydroxyl functional polymeric core-shell particles in the first coating composition is obtained from components that comprise greater than 10 weight % of a hydroxyl functional ethylenically unsaturated monomer, based on the total weight of the components that form the polymeric shell.

4. The multi-layer coating system of claim 1, wherein the crosslinking agent c) in the first coating composition comprises an aminoplast resin.

5. The multi-layer coating system of claim 1, wherein the second crosslinking agent b) in the second coating composition comprises an aminoplast resin.

6. The multi-layer coating system of claim 1, wherein the second coating composition comprises greater than 25 weight % and up to 50 weight % of the second carboxylic acid functional polymeric core-shell particles, based on a total resin solids of the second coating composition.

7. The multi-layer coating system of claim 1, wherein the second coating composition further comprises second hydroxyl functional polymeric core-shell particles that are the same as or different from the hydroxyl functional polymeric core-shell particles in the first coating composition, wherein a polymeric core and a polymeric shell of the second hydroxyl functional polymeric core-shell particles of the second coating composition each independently comprise an addition polymer derived from ethylenically unsaturated monomers.

8. The multi-layer coating system of claim 1, wherein the second coating composition further comprises a third free polyisocyanate different from the second crosslinking agent.

9. The multi-layer coating system of claim 1, wherein the first coating composition and the second coating composition each independently comprise at least one colorant.

10. The multi-layer coating system of claim 1, wherein a weight ratio of the core to the shell of the hydroxyl functional polymeric core-shell particles in the first coating composition is from 95:5 to 70:30.

11. The multi-layer coating system of claim 1, further comprising a primer coating layer, wherein the first coating layer is positioned over at least a portion of the primer coating layer.

12. The multi-layer coating system of claim 1, wherein the free aliphatic polyisocyanate comprises an isocyanurate, a trimer and/or a biuret.

13. A substrate at least partially coated with the multi-layer coating system of claim 1.

14. The substrate of claim 13, wherein the substrate comprises at least a portion of an automobile.

15. A process of coating a substrate with a multi-layer coating comprising:

(1) depositing a first coating composition onto at least a portion of the substrate, wherein the first coating composition comprises:

a) at least two different free polyisocyanates comprising:

i) a free aliphatic polyisocyanate having a weight average molecular weight of less than 600 g/mol, present in an amount of 3.5 to 8 weight %, based on the total resin solids of the first coating composition; and ii) a uretdione dimer different from the free aliphatic polyisocyanate i), present in an amount greater than 9.5 weight %, based on the total resin solids of all the free polyisocyanate in the first coating composition;

b) at least two different types of polymeric core-shell particles comprising:

i) hydroxyl functional polymeric core-shell particles, wherein a polymeric core and a polymeric shell of the hydroxyl functional core-shell particles each independently comprise an addition polymer derived from ethylenically unsaturated monomers, wherein the hydroxyl functional polymeric core-shell particles are present in the first coating composition in an amount of 20 to 60 percent by weight, based on the total weight of resin solids of the first coating composition; and ii) carboxylic acid functional polymeric core-shell particles, wherein a polymeric core of the carboxylic acid functional core-shell particles comprises an addition polymer derived from ethylenically unsaturated monomers including a monomer having at least two ethylenically unsaturated groups and a polymeric shell of the carboxylic acid functional core-shell particles comprises urethane linkages and carboxylic acid functional groups, wherein the carboxylic acid functional polymeric core-shell particles are present in the first coating composition in an amount of 0.1 to 20 percent by weight, based on the total weight of resin solids of the first coating composition; and c) a crosslinking agent different from the free polyisocyanates a);

(2) depositing a second coating composition directly onto at least a portion of the first coating composition (A) after the first coating composition is dehydrated or (B) before the first coating composition is dehydrated, wherein the second coating composition comprises:

a) second carboxylic acid functional polymeric core-shell particles, wherein a polymeric core of the second carboxylic acid functional core-shell particles comprises an addition polymer derived from ethylenically unsaturated monomers and a polymeric shell of the second carboxylic acid functional core-shell particles comprises urethane linkages and carboxylic acid functional groups, wherein the second carboxylic acid functional polymeric core-shell particles are present in the second coating composition in an amount of greater than 20 and up to 60 percent by weight, based on the total weight of resin solids of the second coating composition; and b) a second crosslinking agent;

(3) dehydrating: (a) the second coating composition after (2) (A); or (b) simultaneously the first coating composition and the second coating composition after (2) (B); and (4) depositing a topcoat coating composition over at least a portion of the dehydrated second coating composition, the topcoat coating composition comprising a second free polyisocyanate and at least one film-forming resin reactive with the second free polyisocyanate.

16. The process of claim 15, wherein the first coating composition is dehydrated before application of the second coating composition.

17. The process of claim 15, wherein both the first and second coating compositions are simultaneously dehydrated.

18. The process of claim 15, wherein the first coating composition and second coating composition are dehydrated at a temperature ranging from ambient temperature to 90° C.

19. The process of claim 15, further comprising curing the first and second coating compositions at a temperature of 120° C. or less.

20. The process of claim 15, further comprising curing the first and second coating compositions and the topcoat coating composition simultaneously at a temperature of 120° C. or less.

\* \* \* \* \*